United States Patent
Montgomery

[11] Patent Number: 5,821,403
[45] Date of Patent: Oct. 13, 1998

[54] PIPELINE LEAK DETECTOR

[76] Inventor: Joe M. Montgomery, 700 N. Interchange, Strafford, Mo. 65757

[21] Appl. No.: 798,624

[22] Filed: Feb. 10, 1997

[51] Int. Cl.$^6$ .............................. G01M 3/04; G01M 3/26; B67D 5/04
[52] U.S. Cl. ...................... 73/40.5 R; 73/49.1; 340/623; 137/68; 137/312
[58] Field of Search ............................... 73/40.5 R, 49.1, 73/49.2; 340/623; 137/68, 312

[56] References Cited

U.S. PATENT DOCUMENTS

| | | | |
|---|---|---|---|
| 1,176,107 | 3/1916 | Tucker | 137/68 |
| 1,783,106 | 11/1930 | Biron | 340/623 |
| 2,045,909 | 6/1936 | Haralson | 137/68 |
| 2,467,951 | 4/1949 | Whitley | 202/160 |
| 2,542,591 | 8/1951 | Streety | 137/68 |
| 3,359,798 | 12/1967 | Katselis | 73/308 |
| 3,910,102 | 10/1975 | McLean | 73/40.5 R |
| 3,981,335 | 9/1976 | Deters | 141/46 |
| 4,114,426 | 9/1978 | McClean | 73/40.5 R |
| 4,496,077 | 1/1985 | Zuehlsdorf | 222/61 |
| 4,649,739 | 3/1987 | Horner | 73/49.2 |
| 5,042,290 | 8/1991 | Geisinger | 73/40.5 R |
| 5,131,262 | 7/1992 | Wood et al. | 73/40.5 R |
| 5,157,958 | 10/1992 | Geiseinger | 73/3 |
| 5,173,092 | 12/1992 | Rudder | 55/53 |
| 5,190,069 | 3/1993 | Richards | 137/312 |
| 5,315,862 | 5/1994 | Hasselmann | 73/40.5 R |
| 5,375,454 | 12/1994 | Andrejasich et al. | 73/40.5 R |
| 5,423,340 | 6/1995 | Campbell et al. | 134/110 |
| 5,557,965 | 9/1996 | Fiechtner | 73/49.2 |

Primary Examiner—Michael Brock
Assistant Examiner—J. David Wiggins
Attorney, Agent, or Firm—Jonathan A. Bay

[57] ABSTRACT

A pipeline leak detection apparatus is provided for fluid dispensing system having a dispenser, a storage tank, and a pump and an electric cut-off valve arranged in hydraulic series with the outlet of the storage tank. The pipeline to be monitored extends between the cut-off valve and the dispenser. A control circuit that operates the cut-off valve such that the valve opens with use of the dispenser and closes with non-use in order to hydraulically isolate the storage tank and pump from the pipeline and dispenser during periods of non-use. The leak detection apparatus is connected in a by-pass loop around the pump. It includes a small pot or plenum, a float switch, and a return line for fuel to spill back into the storage tank. The plenum inlet is connected to a branch in the pipeline near the cut-off valve, and its outlet is connected to the return line to the storage tank. The float switch is mounted to the plenum so that its float extends into the plenum chamber. The electrical side of the float switch is connected in the control circuit so that for as long as the float is floated the switch is maintained in one state and produces no effect on the control circuit, but when the float falls the switch changes state and disables the operability of the electric cut-off valve. That way, during use of the dispenser, a fractional amount of the outflow of the pump is diverted through the plenum to keep the float floated; however, during non-use of the dispenser, the falling of the float corresponds to fluid draining out of the plenum chamber as caused by a leak in the pipeline, the result being the disablement of the electric cut-off valve.

13 Claims, 3 Drawing Sheets

PIPELINE LEAK DETECTOR

BACKGROUND AND SUMMARY OF THE INVENTION

The invention relates to pipeline leak detection apparatus for fuel dispensing systems operated on an intermittent basis, and, more particularly, to an improved apparatus for detecting very low leak rates between operative uses.

Retail gasoline stations dispense different grades of gasoline and diesel fuel for automotive vehicles. These fuels are stored in respective storage tanks and are dispensed for the benefit of retail users from various dispensers that are mounted or erected on traffic islands between the various traffic lanes. In the case of an above ground storage tank, a pump at the base of storage tank supplies fuel under pressure to the dispensers via underground pipelines extending under the traffic lanes and islands. The pump conventionally includes an outlet more or less directly connected to a safety cut-off valve. The safety valve is energizable by use of a dispenser such that the valve opens during use of a dispenser and returns closed during non-use. The safety cut-off valve hydraulically isolates the pump and storage tank from the underground pipeline and dispensers so that fuel cannot drain out of the storage tank if given a leak.

Leaks can and do occur between the output of the storage tank and the input of the dispenser. These leaks may result from destructive forces such as settling of the storage tank. Vehicular movement over the ground may cause a shift of the earth and impart sufficient forces to affect the integrity of the junctions or unions disposed along the fuel delivery line. Rocks or other hard substances may impinge upon and wear or otherwise dimple the delivery line sufficiently to develop a leak. Sometimes corrosion due to acids or salts will affect the integrity of the delivery line or a seal at a junction.

Because of the long term destructive effects of seepage of fuel in the ground, the Environmental Protection Agency has established requirements which eliminate or least reduce future ground contamination. To comply with these requirements, as well as to reduce fuel losses and the attendant economic detriments, a device generally known as a leak detector is installed in the piping between the output of the cut-off valve (or if no cut-off valve then output of the fuel pump) and the input to the line delivering fuel from the storage tank to the dispenser.

Conventional diaphragm and also/or else piston-type leak detectors are characterized in having three operative states. In the relaxed state before energization of the pump, a flow into the delivery line at a small rate is permitted. Upon energization of the pump, a poppet valve is partly actuated to limit flow through the leak detector at a rate of 3 gph. Assuming that the delivery line has a leak of less than 3 gph, the pressure within the leak detector will build rapidly (approximately 2 seconds) and the valve will go to the fully open position to permit unimpeded fuel delivery. The idea is that, in the absence of a leak, the pressure response in a leak-free pipeline should be characteristic of the incompressible fuel with a hydraulic impulse applied thereto. Alternatively, a leak close to but less than 3 gph will increase the time required to go to the full delivery position.

These leak detectors, for the most part, perform admirably well over long periods of time with limited maintenance. Unfortunately, due to wear and deterioration, the leak detector may permit full delivery even though a leak greater than 3 gph may be present. Because fuel is still delivered after an initial hesitation period, the gasoline station operator may not be aware of the existence of a leak. The leak detectors are periodically tested but the E.P.A. requirements do not mandate replacement of worn and/or deteriorated leak detectors, replacement is discretionary. Also, false alarms from leak detectors tend to encourage that all alarms from the leak detectors be ignored, which further detracts from the effectiveness and worthiness of pipeline leak prevention. What is needed therefore is a leak detection apparatus that overcomes the shortcomings of the prior art.

It is an object of the invention to provide a pipeline leak detector that avoids poppet valves and like seating or sealing arrangements that degrade with wear and when worn detract from the operative effectiveness of the leak detection apparatus as a whole.

It is an alternate object of the invention that the above leak detection apparatus operate to detect directly a volumetric loss of fuel or fluid in a dispensing system's piping, rather than operate on indirect factors such as failure to build pressure at a given make-up rate and/or undue compressibility and the like.

It is an additional object of the invention that the above leak detection apparatus include a standpipe open at the top (albeit emptying back into the retail gasoline station's main storage tank) such that the drainage of fuel down out of the standpipe during non-use of the dispensing system presumptively corresponds to a fuel leak.

It is another object of the invention that the above leak detector include a float; switch for the standpipe so that the float switch can detect the drainage of fuel down out of the standpipe.

These and other aspects and objects are provided according to a pipeline leak detection apparatus useful for, among other use environments, a fuel dispensing system of a retail gasoline station. The fuel dispensing system conventionally comprises a dispenser, a storage tank remote from the dispenser, and a pump and an electric cut-off valve arranged in hydraulic series with the storage tank. The pipeline to be monitored generally extending between the cut-off valve and the dispenser. A control circuit is provided for the electric cut-off valve such that the valve opens with use of the dispenser and closes with non-use of the dispenser in order to hydraulically isolate the storage tank and pump from the pipeline and dispenser during non-use of the dispenser.

Inventive aspects of the leak detection apparatus include the combination of a standpipe with a float switch. The plenum chamber has an entry port connected to a branch in the pipeline near the cut-off valve and an exhaust port connected to a return line that returns to empty into the main storage tank. The float switch that has an actuator arm that terminates in a float. The float switch is mounted to the plenum so that the float extends into the chamber. The electrical side of the float switch is connected in the control circuit so that for as long as the float is floated the switch is maintained in one state and produces no effect on the control circuit, but when the float falls the switch changes state and disables the operability of the electric cut-off valve.

That way, during use of the dispenser, a fractional amount of the outflow of the pump is diverted through the plenum chamber and onwards to the storage tank via the return line such that the diverted flow keeps the float floated. However, during non-use of the dispenser, the falling of the float corresponds to fuel draining out of the plenum chamber as caused by a leak in the pipeline, the result being the disablement of the electric cut-off valve.

Preferably the return line is given a relatively small inside diameter and the plenum is likewise configured compactly (relative to clearance required by the rising and falling float)

so that the volumetric capacity of the plenum chamber and return line, combined, above an elevation containing the float in a fallen position, corresponds in fluid measure to about a half cup (0.3 liters). However, the actual specified volume can be varied within limits to greater of lesser than a half cup by changing the sizes of the plenum and return line.

Whereas the leak detection apparatus in accordance with the invention is described below primarily with reference to an above-ground storage tank, it can be adapted for use with below ground tanks as well. It is presumed, however, that regardless whether the storage tank is above or below ground, the pipeline is assumed that for substantial portions of its extension, it extends sub-surface. During installation of the leak detection apparatus on the fuel dispensing system, the float switch ought to be located at an elevation not only higher than the subsurface pipeline, but also the dispenser.

Other inventive aspects optionally include that the exhaust port is formed and arranged to define a miniature orifice for choking the rate of diverted flow down to a relative trickle.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
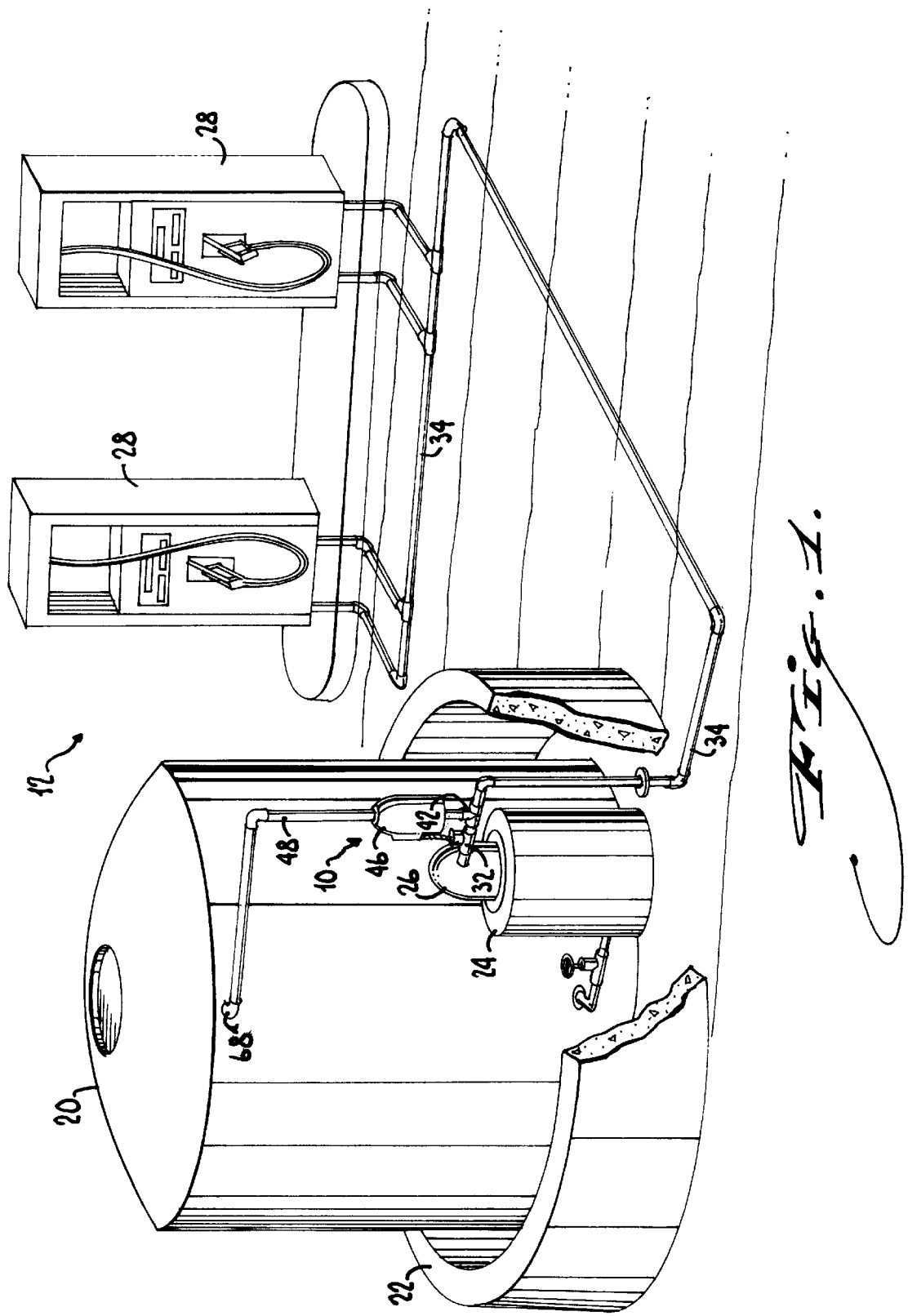
FIG. 1 is a perspective view of a leak detection apparatus in accordance with the invention, as installed on a fuel dispensing system for a retail gasoline station to illustrate an operative environment therefor.

In FIG. 1, a leak detection apparatus 10 in accordance with the invention is installed on the fuel dispensing system 12 of a conventional retail gasoline station.

The fuel dispensing system 12 is generally conventional insofar as the following aspects are concerned. An above-ground storage tank 20 is situated inside a concrete containment dyke 22 and has an outlet that gravity-feeds to a relatively smaller pump-pot 24, which provides a mounting for a main delivery pump (generally indicated by reference numeral 26). The outflow of the pump 26 is dispensed for the benefit of retail customers through one or more dispensers 28 that stand erect upon traffic islands sitting between various traffic lanes which allow vehicular traffic. The outlet of the pump 26 discharges almost directly into an electric cut-off valve 32. The dispensers 28 and cut-off valve 32 are hydraulically interconnected by a main delivery pipeline(s) 34, substantial portions of which extend sub-surface beneath the traffic lanes.

Use of some appropriate type of cut-off valve is generally required by the Environmental Protection Agency in order to hydraulically isolate the pump 26 and tank 20 from the pipeline 34 and dispensers 28 between sales (i.e., or "uses" of the dispensers 28). The electric cut-off valve 32 shown and described here is merely a non-limiting example used for convenience in this description. The electric cut-off valve 32 has a relaxed state in which it is normally shut and an energized state in which it is actively held open. The electric cut-off valve 32 has a power feed via a circuit (not shown in FIG. 1, but indicated as 36 in FIG. 4) which is routed through interrupting devices or switches (not shown) in the dispensers 28. The power feed circuit 36 is configured so that the cut-off valve 32 opens with use of the dispensers 28 and returns closed with non-use.

Inventive aspects of this fuel dispensing system 12 include the leak detection apparatus 10 in accordance with the invention. The leak detection apparatus 10 includes a T-fitting or branch 42 in the main delivery line 34 having a point of origin in the main line 34 very, near the outlet of the electric cut-off valve 32. The branch 42 diverts a fractional amount of the outflow of the pump through a branch line 44 and standpipe 46, and back into the main storage tank 20 via a return line 48. Further aspects of the standpipe 46 and return line 48 are shown better by FIGS. 2 and 3.

Figure 2:
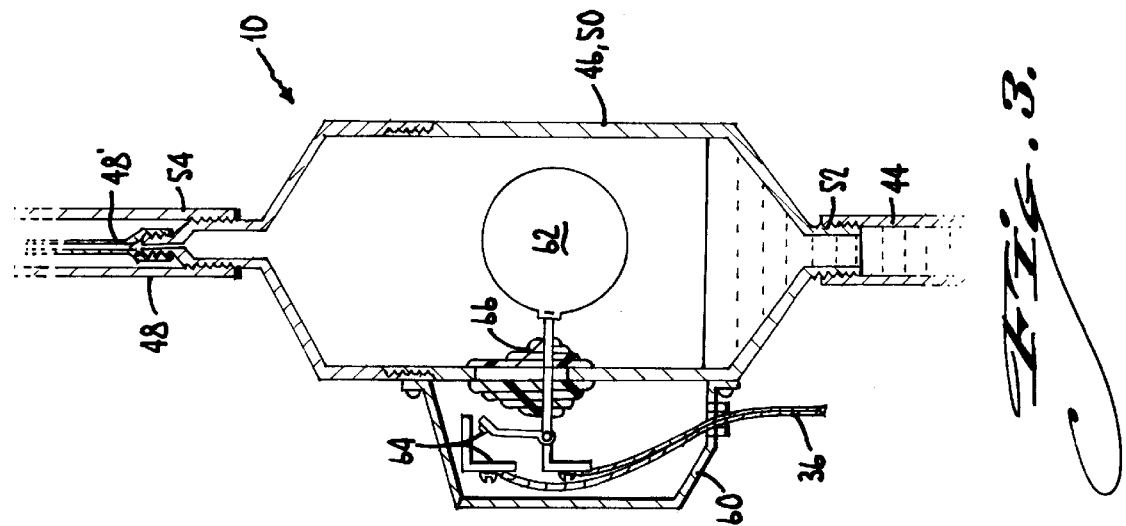
FIG. 2 is a sectional view of a standpipe and float switch in FIG. 1 and in accordance with the invention, as taken through a vertical axis of symmetry thereof.
Figure 3:
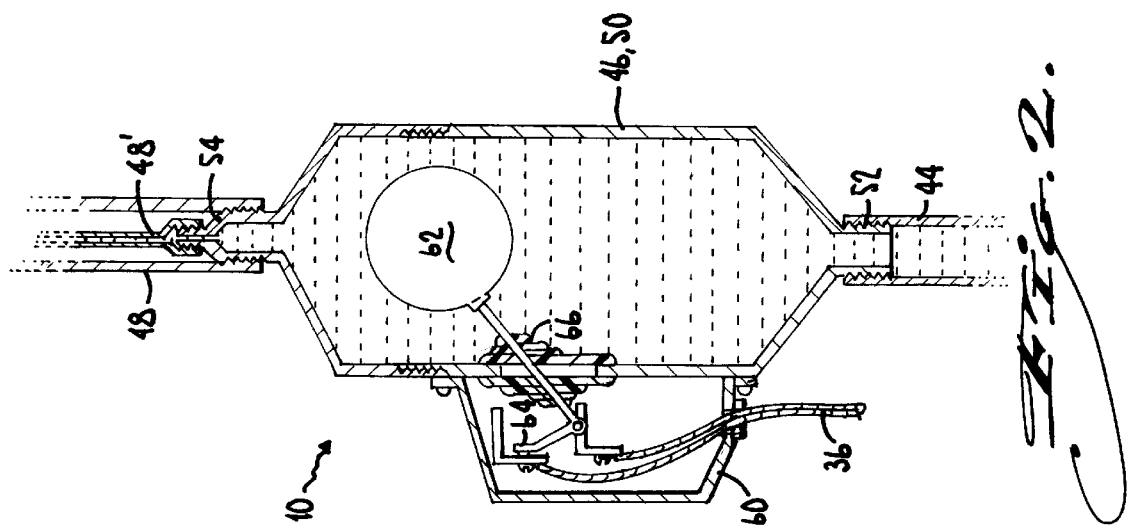
FIG. 3 is a view comparable to FIG. 2 except showing a change in the float switch caused by fuel having drained down in the standpipe; and, FIG. 4 is a diagrammatic sectional view of FIG. 1.

With reference to FIGS. 2 and 3, what has been termed "standpipe" 46 above, is shown to have the form of a cylindrical vessel or plenum 50 with an inside diameter several times larger than the branch line 44. The plenum 50 can be disassembled into upper and lower halves along a threaded partition. The plenum 50 has an entry port 52 connected to the main delivery line 34 via the branch fitting 42 (out of view, but see FIG. 1), and an exhaust port 54 connected to the return line 48. The exhaust port 54 converges inward to the size of a relatively miniature orifice for the purpose of, during use, throttling the rate of the diverted flow down to a relative trickle. The exhaust port 54 is formed as a flare-fitting nipple to allow a flare-fitting tube connection with the return line 48'. What in FIG. 1 was referred to as the "return line" is shown by FIGS. 2 and 3 to be a protective sheath 48 surrounding the actual return line 48, which itself is no more than very small diameter flexible tubing. The return line 48' extends out of view of FIGS. 2 or 3 to empty back into the main storage tank 20 (see, e.g., FIGS. 1 or 4).

The plenum 50 has a sidewall that provides a mounting surface for a float switch 60. The float switch 60 includes an actuator arm that terminates in float 62 extended into the plenum chamber 50. The rising and falling of the float 62 makes and respectively, a circuit through contacts 64 of the float switch 60. Leakage of fuel from the plenum chamber 50 into the circuitry is prevented by a bellows seal 66 surrounding the actuator arm.

Figure 4:
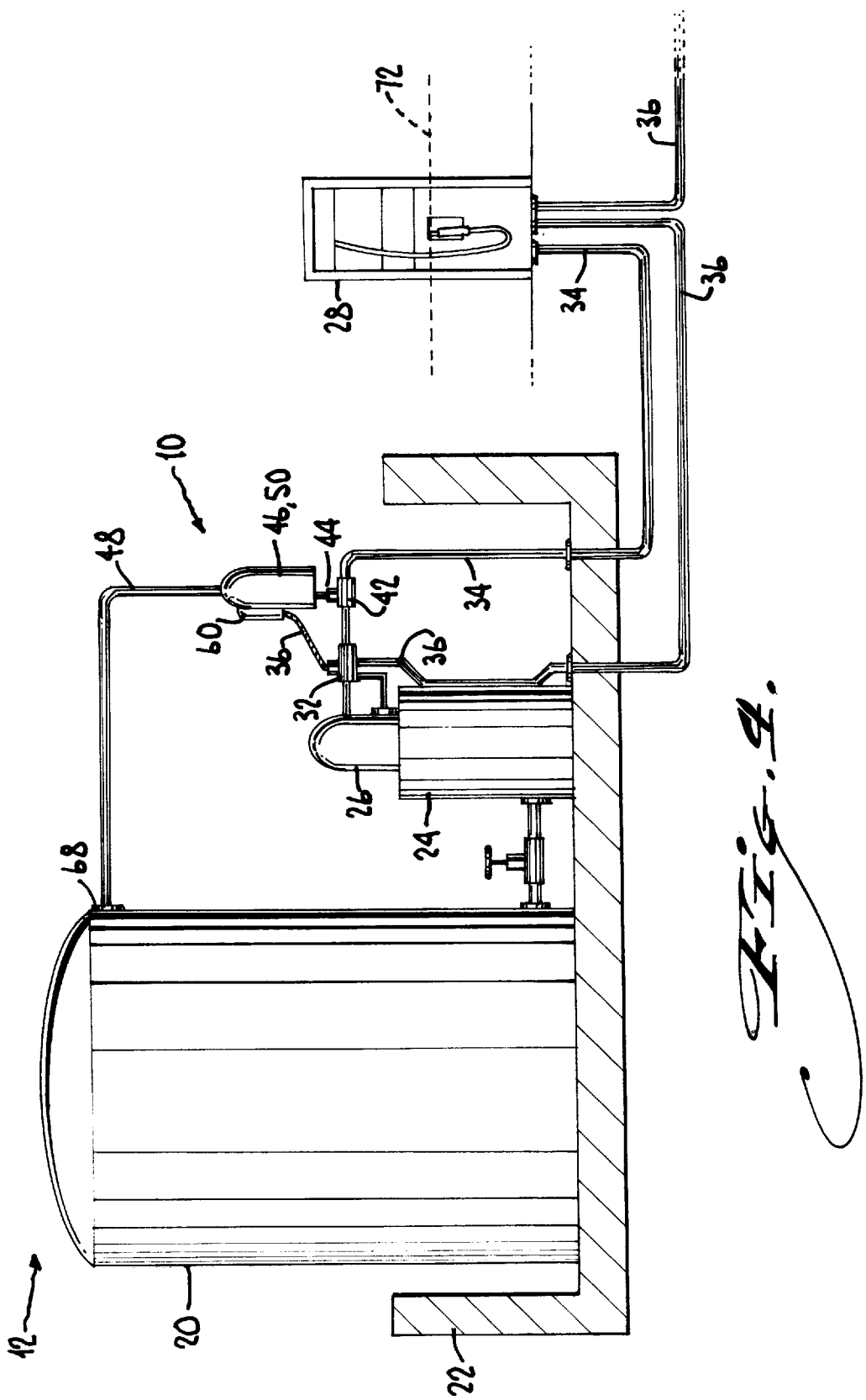

With reference to FIG. 4, use of the fuel dispensing system 12 (i.e., during a sale) begins with operation of a dispenser 28, which causes the pump 26 to switch ON and energizes the cut-off valve 32 to change to OPEN. The pump 26 pressurizes the main delivery line 34 to about twenty-six psig. The flow of fuel at the branch 42 is divided, in which the overwhelming percentage of the fuel continues onward to dispenser 28, but at least a small fractional amount is diverted into the standpipe 46, through the plenum chamber 50, and onwards into the storage tank 20 via the return line 48'. This diverted flow of fuel keeps the float 62 floated and the contacts 64 closed (see, e.g., FIG. 2). Thus completion of the power feed circuit 36 to the cut-off valve 32 is completed at least in terms of the action of the float switch 64. In other words, the float switch 64—while the float 62 is floated—produces no effect on the power feed circuit 36 of the cut-off valve 32.

Between sales (i.e., uses of the dispensers 28), the power feed circuit 36 to the pump 26 and electric cut-off valve 32 is broken or interrupted at the dispensers 28, and the pump 26 switches OFF and the cut-off valve 32 de-energizes and relaxes to its CLOSED position. The flow of fuel comes to a stop both in the delivery ling 34 as well as the standpipe 46 and return line 48, which results in fuel being hydraulically isolated in the delivery line 34 between the cut-off valve 32 and the dispenser 28. The pressure in the delivery line 34 bleeds out and is allowed to equalize in accordance with the return line 48 exhausting into the top of the storage tank 20 at a spillover point indicated generally by reference numeral 68.

Provided that there are no leaks or breaks in the main delivery line 34, the plenum chamber 50 should remain full with fuel and the float 62 floated (as shown by FIG. 2). However, the falling of the float 62 (see, e.g., FIG. 3) corresponds to fuel draining out of the plenum 50 and is presumed to be the result of a leak (or leaks) in the piping 34 somewhere between the cut-off valve 32 and dispenser 28. As FIG. 3 shows, the falling float 62 opens the contacts 64 of the float switch 60, which interrupts the power feed circuit 36 to the cut-off valve 32, thereby disabling its operability in spite of any attempt by a user to dispense fuel via the dispenser 28.

As FIGS. 2 and 3 show, the return line tubing 48' is given a relatively small diameter and correspondingly the plenum 50 is sized rather compactly (relative to the clearance required by the float 62 to rise and fall) such that, the volumetric capacity of the plenum 50 and return line 48' combined, above an elevation containing the float 62 in a fallen position, corresponds in fluid measure to about, for example, a half cup (0.3 liters). The plenum 50 and return line 48' can be varied in size, within limits, to get a greater or lesser specified volume, as desired, than the half cup given in the example. Staying with the example of a half cup capacity, if, between sales, a half cup of fuel should leak out of delivery line 34 somewhere underground, then the fuel in the return line 48' and standpipe 46 will drain down and eventually drop the float 62. The falling float 62 opens the contacts 64 of the switch 60, and thus interrupts the power feed circuit 36 to the cut-off valve 32, thereby disabling it. Given the foregoing, if, after a sale, a half cup or so of fuel should leak out of pipeline 34 (regardless whether it occurs over one hour or over night), then the float 62 will fall and open the contacts 64 and so disable the cut-off valve 32. It will not be possible to dispense fuel again through delivery line 34 until after manual inspection and service.

Returning to FIG. 4, the dispenser 28 has a reference elevation 72 drawn through it. This reference elevation 72 generally corresponds to the location of the relevant hydraulics inside the dispenser 28 that represent the terminus of the delivery line 34 just before a cut-off valve (not shown) associated with the dispenser 28. The significance of this reference elevation 72 is the following. The standpipe plenum chamber 50 should be located at a relative elevation that is higher than the dispenser reference elevation 72. More particularly, the given elevation (not referenced) that contains the float 62 in its fallen position (which is shown by FIG. 3) should be higher than the dispenser reference elevation 72, as shown by FIG. 4. This precludes the possibility—if the dispenser elevation 72 were higher than the float valve 60 (not shown)—of an undetectable leak occurring in an intermediate elevation between the higher dispenser and lower float valve (again, this being an arrangement which is not shown).

The return line 48 merely exhausts into the storage tank 20 and at the elevation of the spillover point 68. It is preferred if the spillover point 68 is located higher than the allowable high level limit for fuel in the storage tank 20. That way a siphon condition won't develop during the by-pass of the diverted fuel flow through the standpipe 46. Otherwise, siphoning would result in a possible suction inside the standpipe 46 after the pump 26 shuts off, which would detract from the operative effectiveness of the standpipe 46 and float switch 60. What happens instead is that, any tendency to create a siphon in the return line 48 is avoided because the suction is bled off at the spillover point 68 lenel. Accordingly, it is preferred if the spillover point is located at the high elevation of the return line 48. The leak detection apparatus 10 in accordance with the invention could be adapted for use with an underground storage tank(not shown) if some sort of conventional siphon-breaking or suction-bleeding apparatus (not shown) were installed in the return line 48 at its high elevation.

The leak detection apparatus 10 in accordance with the invention is relatively insensitive to daily or seasonal temperature variations because the system 12 is open at the return line spillover point 68, where it vents into the ventilated storage tank 20. In a closed system (not shown), warming temperatures cause expansion of the fuel and result in elevated line pressures, whereas cooling temperatures cause contraction of the fuel and result in falling line pressures. The foregoing effects in a closed system can interfere with some of the prior art leak detection apparatus (not shown) that respond to pressure decay or undue compressibility in order to detect leaks. In the open system 12 in accordance with the invention, warming temperatures result in a small spillover of fuel out of the return line spillover 68 into the storage tank 20, whereas cooling temperatures result in retreat of the fuel level in the return line 48 away from the spillover point 68, however the retreating fuel level will not ever approach in volumetric measure the, half cup of fuel or so required to trip the float switch 60.

In the drawings, the leak detection apparatus, 10 is shown installed in a fuel dispensing system 12 of a retail gasoline station. However, the leak detection apparatus 10 can be adapted for leak detection uses in hydraulic systems other than fuel systems as well as in environments other than retail gasoline stations, and accordingly, the example of fuel dispensing in a retail gasoline station is used merely for convenience in this description and does not limit the invention to a particular field and/or usage within a given field.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A fuel dispensing system comprising:
   a dispenser;
   a storage tank remote from the dispenser;
   a pump and an electric cut-off valve arranged in hydraulic series with the storage tank;
   a pipeline extending between the cut-off valve and the dispenser;

a control circuit for the electric cut-off valve such that the valve opens with use of the dispenser and closes with non-use of the dispenser in order to hydraulically isolate the storage tank and pump from the pipeline and dispenser during non-use of the dispenser;

a plenum defining a chamber and having an entry port connected to a branch in the pipeline near the cut-off valve and an exhaust port connected to a return line that empties into the storage tank;

a float switch that has an actuator arm with a float, and is mounted to the plenum so that the float is extended into the chamber, as well as being connected in the control circuit so that for as long as the float is floated on fuel contained or flowing within the chamber the switch is maintained in one state and produces no effect on the control circuit, but when the float falls the switch changes state and disables the operability of the electric cut-off valve; wherein during use of the dispenser a fractional amount of the outflow of the pump is diverted through the plenum chamber and onwards to the storage tank via the return line such that the diverted flow keeps the float floated, and during non-use of the dispenser the falling of the float corresponds to fuel draining out of the plenum chamber as caused by a leak in the pipeline, the result being the disablement of the electric cut-off valve;

wherein the exhaust port is formed and arranged to define a miniature orifice and the return line is given a relatively small inside diameter, for choking the rate of diverted flow down to a relative trickle.

2. The fuel dispensing system of claim 1, wherein:
the storage tank comprises an above-ground installation.

3. The fuel dispensing system of claim 1, wherein:
the pipeline for substantial portions of its extension extends sub-surface.

4. The fuel dispensing system of claim 1, wherein:
the control circuit comprises a circuit that feeds power to the electric cut-off valve, wherein the float switch is configured to make or break the power feed circuit corresponding to whether the float is floated or fallen, respectively.

5. A fuel dispensing system comprising:
a dispenser;
a storage tank remote from the dispenser;
a pump and an electric cut-off valve arranged in hydraulic series with the storage tank;
a pipeline extending between the cut-off valve and the dispenser;
a control circuit for the electric cut-off valve such that the valve opens with use of the dispenser and closes with non-use of the dispenser in order to hydraulically isolate the storage tank and pump from the pipeline and dispenser during non-use of the dispenser;
a plenum defining a chamber and having an entry port connected to a branch in the pipeline near the cut-off valve and an exhaust port connected to a return line that empties into the storage tank;
a float switch that has an actuator arm with a float, and is mounted to the plenum so that the float is extended into the chamber, as well as being connected in the control circuit so that for as long as the float is floated on fuel contained or flowing within the chamber the switch is maintained in one state and produces no effect on the control circuit, but when the float falls the switch changes state and disables the operability of the electric cut-off valve; wherein during use of the dispenser a fractional amount of the outflow of the pump is diverted through the plenum chamber and onwards to the storage tank via the return line such that the diverted flow keeps the float floated, and during non-use of the dispenser the falling of the float corresponds to fuel draining out of the plenum chamber as caused by a leak in the pipeline, the result being the disablement of the electric cut-off valve;

wherein the plenum chamber is installed at an elevation higher than the dispenser.

6. The fuel dispensing system of claim 5, wherein:
the return line is given a relatively small inside diameter and the plenum is configured compactly relative to clearance space required by the rising and falling float such that the volumetric capacity of the plenum chamber and return line, combined, above an elevation containing the float in a fallen position, corresponds in fluid measure to about a half cup (0.3 liters).

7. A fluid dispensing system operated intermittently, comprising:
a storage tank;
a pump and an electric cut-off valve hydraulically connected in line of an outlet of the storage tank;
dispensing valve means, remote from the storage tank, for dispensing the outflow of the pump;
a delivery line extending between the cut-off valve and the dispensing valve means;
a control circuit for the cut-off valve that delivers control signals which change the valve reversibly between open and shut;
a plenum defining a chamber which is in fluid communication with the delivery line at an origin downstream from the cut-off valve, the plenum chamber including a vent connected to a return line that empties into the storage tank;
detecting means coupled to the plenum for detecting if a specified volume of fluid has drained out of the plenum back into the delivery line, the detecting means also including switching means connected to the control circuit so that for as long as the specified volume of fluid has not drained out of the plenum chamber the detecting means via the switching means allows the cut-off valve to operate between its open and shut states, but if otherwise then the switching means changes the control circuit and disables the operability of the cut-off valve and leaves it in its shut state only; wherein during use of the pump and dispensing valve means a fractional amount of the outflow of the pump is diverted through the plenum chamber and onwards to the storage tank via the return line such that the diverted flow keeps the detecting means from detecting any drainage of fluid in the reverse direction, and during non-use of the pump and dispensing valve means the detection of the drainage of the specified volume of liquid corresponds to a leak in the delivery line, the result being the disablement of the cut-off valve in its shut position;

wherein the plenum chamber is installed at an elevation higher than the dispensing valve means.

8. The fluid dispensing system of claim 7, wherein:
the control circuit and cut-off valve are configured such that the cut-off valve opens with use of the dispensing valve means and closes with non-use of the dispensing valve means in order to hydraulically isolate the storage tank and pump from the delivery line and dispensing valve means during non-use of the dispensing valve means.

9. The fluid dispensing system of claim 7, wherein:
the storage tank comprises an above-ground installation.

10. The fluid dispensing system of claim 7, wherein:
the delivery line for substantial portions of its extension extends sub-surface.

11. The fluid dispensing system of claim 7, wherein:
the control circuit comprises an electric circuit, the switching means comprises an electric switch, and the cut-off valve comprises an electro-mechanically-actuated valve.

12. A fluid dispensing system operated intermittently, comprising:

a storage tank;

a pump and an electric cut-off valve hydraulically connected in line of an outlet of the storage tank;

dispensing valve means, remote from the storage tank, for dispensing the outflow of the pump;

a delivery line extending between the cut-off valve and the dispensing valve means;

a control circuit for the cut-off valve that delivers control signals which change the valve reversibly between open and shut;

a plenum defining a chamber which is in fluid communication with the delivery line at an origin downstream from the cut-off valve, the plenum chamber including a vent connected to a return line that empties into the storage tank;

detecting means coupled to the plenum for detecting if a specified volume of fluid has drained out of the plenum back into the delivery line, the detecting means also including switching means connected to the control circuit so that for as long as the specified volume of fluid has not drained out of the plenum chamber the detecting means via the switching means allows the cut-off valve to operate between its open and shut states, but if otherwise then the switching means changes the control circuit and disables the operability of the cut-off valve and leaves it in its shut state only; wherein during use of the pump and dispensing valve means a fractional amount of the outflow of the pump is diverted through the plenum chamber and onwards to the storage tank via the return line such that the diverted flow keeps the detecting means from detecting any drainage of fluid in the reverse direction, and during non-use of the pump and dispensing valve means the detection of the drainage of the specified volume of liquid corresponds to a leak in the delivery line, the result being the disablement of the cut-off valve in its shut position;

wherein one of the return line, the plenum, and the detecting means is configured on such a scale that the specified volume of fluid corresponds in fluid measure to about a half cup.

13. A fluid dispensing system operated intermittently, comprising:

a storage tank;

a pump and an electric cut-off valve hydraulically connected in line of an outlet of the storage tank;

dispensing valve means, remote from the storage tank, for dispensing the outflow of the pump;

a delivery line extending between the cut-off valve and the dispensing valve means;

a control circuit for the cut-off valve that delivers control signals which change the valve reversibly between open and shut;

a plenum defining a chamber which is in fluid communication with the delivery line at an origin downstream from the cut-off valve, the plenum chamber including a vent connected to a return line that empties into the storage tank;

detecting means coupled to the plenum for detecting if a specified volume of fluid has drained out of the plenum back into the delivery line, the detecting means also including switching means connected to the control circuit so that for as long as the specified volume of fluid has not drained out of the plenum chamber the detecting means via the switching means allows the cut-off valve to operate between its open and shut states, but if otherwise then the switching means changes the control circuit and disables the operability of the cut-off valve and leaves it in its shut state only; wherein during use of the pump and dispensing valve means a fractional amount of the outflow of the pump is diverted through the plenum chamber and onwards to the storage tank via the return line such that the diverted flow keeps the detecting means from detecting any drainage of fluid in the reverse direction, and during non-use of the pump and dispensing valve means the detection of the drainage of the specified volume of liquid corresponds to a leak in the delivery line, the result being the disablement of the cut-off valve in its shut position;

wherein the vent is formed and arranged to define a miniature orifice and the return line is given a relatively small inside diameter, for choking the rate of diverted flow down to a relative trickle.

* * * * *